US012694722B2

(12) United States Patent

Schlosser et al.

(10) Patent No.: US 12,694,722 B2

(45) Date of Patent: Jul. 28, 2026

(54) BREAKDOWN ASSISTANCE DEVICE HAVING AN INTERFACE FOR POWER SUPPLY AND DATA TRANSMISSION, METHOD FOR CONTROLLING SUCH A DEVICE, AND SYSTEM COMPRISING SUCH A DEVICE

(71) Applicant: Continental Reifen Deutschland GmbH, Hannover (DE)

(72) Inventors: Florian Schlosser, Barsinghausen (DE); Rainer Detering, Neustadt am Ruebenberge (DE)

(73) Assignee: Continental Reifen Deutschland GmbH, Hannover (DE)

( * ) Notice: Subject to any disclaimer, the term of this patent is extended or adjusted under 35 U.S.C. 154(b) by 404 days.

(21) Appl. No.: 18/252,314

(22) PCT Filed: Oct. 20, 2021

(86) PCT No.: PCT/DE2021/200154

§ 371 (c)(1),
(2) Date: May 9, 2023

(87) PCT Pub. No.: WO2022/096069

PCT Pub. Date: May 12, 2022

(65) Prior Publication Data

US 2024/0013583 A1      Jan. 11, 2024

(30) Foreign Application Priority Data

Nov. 9, 2020      (DE) ..................... 10 2020 214 023.5

(51) Int. Cl.
*G07C 5/00*          (2006.01)
*B60S 5/04*          (2006.01)

(52) U.S. Cl.
CPC .............. *G07C 5/008* (2013.01); *B60S 5/046* (2013.01)

(58) Field of Classification Search
CPC ............................... B60S 5/046; B29C 73/166
See application file for complete search history.

(56) References Cited

U.S. PATENT DOCUMENTS

| | | | |
|---|---|---|---|
| 10,933,844 B2 * | 3/2021 | Spindler | ............ G05D 16/2066 |
| 2003/0056851 A1 | 3/2003 | Eriksen et al. | |

(Continued)

FOREIGN PATENT DOCUMENTS

| | | |
|---|---|---|
| CN | 103596780 A | 2/2014 |
| CN | 104405614 A | 3/2015 |

(Continued)

OTHER PUBLICATIONS

International Search Report dated Jan. 26, 2022 of International Application PCT/DE2021/200154 on which this application is based.

(Continued)

*Primary Examiner* — Timothy L Maust
(74) *Attorney, Agent, or Firm* — Gregory Adams; Richard A. Wolf

(57)          ABSTRACT

A breakdown assistance device for sealing and inflating vehicle tires, has a feed opening for feeding in a sealant, and a pressure source. The breakdown assistance device has at least one interface that is designed for supplying power and for transmitting data. A breakdown assistance device for sealing and inflating vehicle tires, includes a distributor device with a sealant and a pressure source with an electric motor that is designed for a rated voltage of greater than 12 volts. The breakdown assistance device has at least one interface 6 that is designed for supplying power and for transmitting data. A method for controlling a breakdown (Continued)

assistance device and a system for sealing and inflating vehicle tires, including a breakdown assistance device and an on-board computer of a vehicle.

20 Claims, 1 Drawing Sheet

(56) References Cited

U.S. PATENT DOCUMENTS

| | | | |
|---|---|---|---|
| 2010/0235044 A1* | 9/2010 | Sawada | B60C 23/002 |
| | | | 701/36 |
| 2011/0155280 A1 | 6/2011 | Eckhardt | |
| 2014/0099428 A1 | 4/2014 | Paasch | |
| 2015/0283570 A1 | 10/2015 | West | |
| 2017/0326824 A1 | 11/2017 | Bialach | |
| 2019/0275756 A1 | 9/2019 | Zaum et al. | |
| 2019/0389435 A1 | 12/2019 | Spindler et al. | |

FOREIGN PATENT DOCUMENTS

| | | | |
|---|---|---|---|
| CN | 108496002 A | 9/2018 | |
| CN | 111491812 A | 8/2020 | |
| DE | 10210068 A1 * | 6/2003 | ............. B60S 5/046 |
| DE | 102016209302 A1 | 12/2017 | |
| EP | 2123432 A1 | 11/2009 | |
| EP | 2338671 A2 | 6/2011 | |
| EP | 3227097 A1 | 10/2017 | |
| FR | 3059271 A1 | 6/2018 | |
| WO | 02066236 A1 | 8/2002 | |

OTHER PUBLICATIONS

CN Office Action dated Sep. 18, 2025 of counterpart Chinese Application No. 202180075540.4.
CN Office Action dated Mar. 11, 2026 of counterpart Chinese application No. 202180075540.4.

* cited by examiner

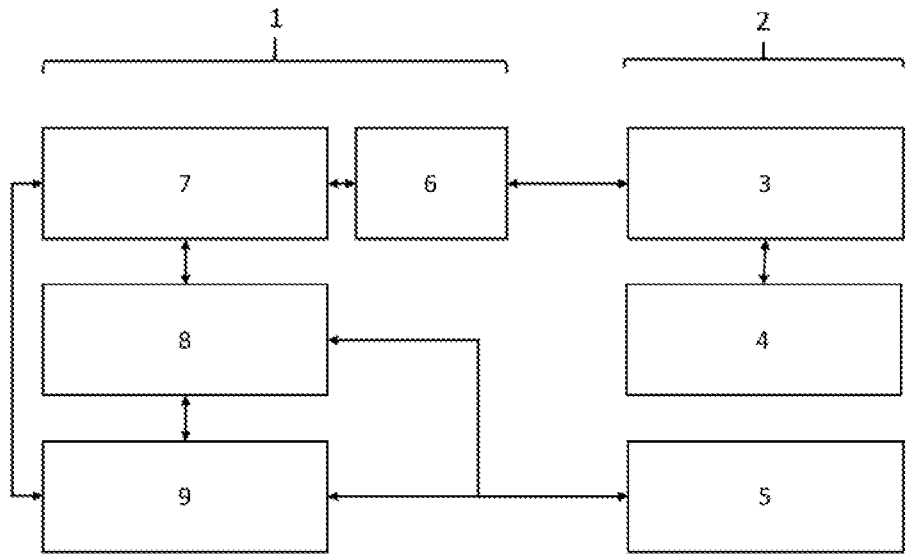

BREAKDOWN ASSISTANCE DEVICE HAVING AN INTERFACE FOR POWER SUPPLY AND DATA TRANSMISSION, METHOD FOR CONTROLLING SUCH A DEVICE, AND SYSTEM COMPRISING SUCH A DEVICE

BRIEF SUMMARY

A breakdown assistance device for sealing and inflating vehicle tires is provided. The invention furthermore relates to a breakdown assistance device for sealing and inflating vehicle tires, to a method for controlling such a breakdown assistance device and to a system for sealing and inflating vehicle tires.

Breakdown assistance devices are known in the prior art and are used in particular when vehicle tires suffer damage in the form of holes when driving over sharp objects, for example. In addition to the option of using a spare tire, as development progresses, breakdown assistance kits or breakdown kits are being accommodated in a vehicle for weight-saving purposes, these being able to be used in the event of vehicle tire damage. Such breakdown assistance kits generally comprise a compressor for generating compressed air and a sealant that is introduced into the damaged vehicle tire. DE 102016209302 A1 discloses for example a method for sealing and inflating inflatable objects, in particular for sealing and inflating motor vehicle tires, and a device having a compressor for performing such a method. The sealant required for such breakdown assistance kits may be applied either manually by the user (squeeze system) or with the aid of a compressor (pump system).

Since such a compressor requires a power supply, current breakdown assistance kits have to be connected to the vehicle on-board power socket by way of a cable. Such a vehicle on-board power socket usually delivers DC current at 12 volts. Current developments, in particular those of electric cars, are tending to install vehicle on-board power sockets less frequently, or are even dispensing with them entirely. One problem is that the breakdown assistance devices described in the prior art are designed with power cables only for the vehicle on-board power sockets. Another problem is that the compressor in a breakdown assistance device requires a certain amount of power in order to meet the requirements in terms of the individual compressed air for a vehicle tire, meaning that not every power source is suitable.

This is where the present invention comes in. The object of the present invention is to provide a breakdown assistance device for sealing and inflating vehicle tires that is able to be used flexibly, thereby making it possible to save costs. The object of the present invention is also to provide a method for controlling such a breakdown assistance device, which method is able to be used flexibly. The object of the present invention is furthermore to provide a system for sealing and inflating vehicle tires, which system is able to be used flexibly in different vehicles.

This object is achieved by the breakdown assistance device having the features of claim 1, by the breakdown assistance device having the features of claim 10, by a method for controlling one of the breakdown assistance devices having the features of claim 12 and by a system for sealing and inflating vehicle tires having the features of claim 14. Preferred or advantageous embodiments of the invention will become apparent from the dependent claims and/or the following description.

The object is achieved by a breakdown assistance device for sealing and inflating vehicle tires, comprising a feed opening for feeding in a sealant, and a pressure source, wherein the breakdown assistance device has at least one interface that is designed for supplying power and for transmitting data. The pressure source is advantageously supplied with power via the described interface, as a result of which the conventional vehicle on-board power socket is able to be replaced by another power source in the vehicle, with this not necessarily having to be arranged in the vehicle. It is therefore advantageous for a cable for connecting the interface to a power source to be able to be selected individually, as a result of which the user is able to use such a breakdown assistance device flexibly. This is particularly important when the distance between the vehicle tire valve and the power source is unusually large. This is conceivable for example if the power source is arranged in a decentralized manner in the trunk or in the case of agricultural vehicles, trucks or trailers. However, it is also conceivable for the breakdown assistance device to be operated using a mobile power source that is not part of a vehicle. A sufficiently powerful power bank or power station may for example be used for this purpose. The breakdown assistance device may thus be used independently of a vehicle. This makes sense for example if the vehicle has a connection option or access to a connection is difficult.

In the context of the invention, the interface is designed such that it is able to be used both for supplying power and additionally for transmitting data. Advantageously, the interface is able to transmit data required during the supply of power, which data are essential for example for operating and/or controlling the breakdown assistance device. By way of example, data may be transmitted only whenever this appears necessary or when data are transmitted through the operation and/or control of a user on a user interface. It is common for the breakdown assistance device to be connected to a vehicle via the interface according to the invention. To this end, the data may be transmitted via the interface according to the invention both from the breakdown assistance device to the vehicle and vice versa. Various data are conceivable. Data useful for controlling the breakdown assistance device are advantageous. By way of example, the data may provide information about the air pressure in the vehicle tire and/or information about the amount of sealant in the breakdown assistance device and/or about the amount of sealant that has already been fed to the vehicle tire. Accordingly, the breakdown assistance device may be controlled and/or information may be read using the data in the vehicle or another external device via the interface according to the invention. Control is conceivable by transmitting control data from the vehicle to the breakdown assistance device in order to start or stop the process of filling the vehicle tire with air and/or sealant. The data may be transmitted from a vehicle, for example, via an interface in the vehicle. Such an interface may also receive data. Furthermore, the breakdown assistance device may preferably have a data processing device that is designed to receive and/or read in and/or transmit and/or read out and/or process and/or forward data. The breakdown assistance device may thereby be controlled and operated by an operator for example from inside a vehicle, in particular via an on-board computer. The data processing device may be connected to a pressure source, for example, such that the pressure source is able to be controlled, in particular switched on and off, via such an device. The data to be transmitted may for example be transmitted at a speed of up to 1.5 Mbit/s (low speed) or up to 12 Mbit/s (full speed) or up to 480 Mbit/s (high speed) or up to 4 Gbit/s (SuperSpeed) or up to 9.7 Gbit/s (Superspeed+) or more. The transmission may take place in both directions, both from the breakdown assistance device to the vehicle and/or external transceiver device and vice versa.

The breakdown assistance device may be used for all types of vehicle tires. Vehicle tires for land vehicles, watercraft and/or aircraft are conceivable, for example. These include for example passenger cars, in particular electric cars, trucks, motorcycles, bicycles, wheelchairs, rickshaws, agricultural vehicles such as tractors, boats and/or airplanes. Other types of vehicles that have at least one vehicle tire that is filled with air are also conceivable.

The feed opening according to the invention is designed such that sealant is able to be fed to the breakdown assistance device. By way of example, a container or a vessel containing sealant may be connected to the feed opening. To this end, the feed opening may have a thread into which for example the container containing sealant is screwed. Other ways of connecting a vessel or container are likewise conceivable. The feed opening may be closed off by a valve, for example. Other types of closure are likewise conceivable. The feed opening is preferably part of an elongate hollow body. According to the invention, the feed opening is configured to transport sealant through an elongate hollow body at a specific time through the breakdown assistance device into a vehicle tire.

The pressure source according to the invention is designed to generate pressure in order to transport air or sealant into the vehicle tire. To this end, it is supplied with power via the interface.

The sealant according to the invention may be designed in various ways. By way of example, it is possible to use a sealant described in EP3227097A1. Other sealants are likewise conceivable. The sealant advantageously seals the damaged vehicle tire from the inside, such that it is possible to maintain a pressure in the vehicle tire again after the damaged section has been sealed.

In one embodiment of the invention, the at least one interface is a USB interface or a Lightning interface or a Thunderbolt interface. These interfaces are advantageously designed both for supplying power and for transmitting data.

According to the invention, a USB interface is a universal serial bus interface. Such a USB interface may be a socket, it being possible to use any possible variant with regard to the socket type. It is conceivable for example to use a socket type selected from the group consisting of Standard-A, Standard-B, Powered-B, Mini-AB, Mini-B, Micro-AB, Micro-B or Type C. It is also conceivable for the breakdown assistance device to have only one cable that has a USB plug with at least one USB connector plug selected from the group consisting of Standard-A, Standard-B, Powered-B, Mini-AB, Mini-B, Micro-AB, Micro-B or Type C. Using a USB interface, it is possible to transmit data between the breakdown assistance device and a vehicle for example at 1.5 Mbit/s (low speed), 12 Mbit/s (full speed), 480 Mbit/s (high speed), 4 Gbit/s (SuperSpeed) or 9.7 Gbit/s (Superspeed+).

In one embodiment of the present invention, the at least one USB interface is a USB 3.0 and/or USB 3.1 and/or USB-BC and/or USB-PD interface. Advantageously, USB generation 3.0 or newer is able to provide enough power to generate enough compressed air to inflate a vehicle tire. It is conceivable for the USB interface to be one selected from the group consisting of Standard-A, Standard-B, Powered- B, Mini-AB, Mini-B, Micro-AB, Micro-B or Type C. Conventional vehicle on-board power plugs may thus advantageously be replaced.

In one embodiment of the invention, the pressure source is a compressor that comprises an electric motor and in particular a motor control device, wherein the electric motor is preferably designed only for a rated voltage greater than 12 volts, particularly preferably only for at least 20 volts. Advantageously, pressure is generated by the compressor in order to pump the air or the sealant into the vehicle tire. An optional motor control device may be arranged between the interface and the electric motor. It is conceivable for the motor control device to be an on/off button. However, other motor control devices are likewise conceivable. Advantageously, the electric motor is preferably designed for a rated voltage greater than 12 volts, since the power sources in future vehicles will be designed for higher powers. Some vehicle types are designed only for voltages of at least 20 volts, in particular 24 volts. The breakdown assistance device may advantageously be flexibly connected to an individual power source via the interface.

The electric motor is an electromechanical converter that converts electric power into mechanical power. The electric motor is usually connected to the motor control device. The motor is able to be controlled via this motor control device. The electric motor is designed for the power that is required individually by the compressor to generate compressed air to inflate a vehicle tire. The interface is configured such that it is designed for enough power to supply power to the electric motor.

The motor control device is usually connected to the electric motor. The motor control device is furthermore connected to the at least one interface, such that power is supplied via the motor control device via the at least one interface, wherein the power is carried via the motor control device to the electric motor. As an alternative, it is conceivable for the at least one interface to be connected both to the motor control device and to the electric motor, such that power is supplied simultaneously. The motor control device may for example be a switch, as a result of which the electric motor is able to be switched on and off. It is also conceivable for the motor control device to be connected to an additional wireless interface, as a result of which the electric motor is able to be controlled via an external device, for example a mobile telephone. Advantageously, the breakdown assistance device is able to be controlled externally via an app.

In a further embodiment of the present invention, the at least one interface is designed only for DC current with a power of at least 30 watts, in particular at least 50 watts. Advantageously, the electric motor is matched to said power, such that it is possible to operate the breakdown assistance device at powers of more than 30 watts. A minimum power is necessary in order to generate enough compressed air to inflate a vehicle tire. As a rule, the at least one interface is designed for a current of at least 2 amperes and a voltage of at least 5 volts, preferably more than 12 volts, particularly preferably 20 volts and 5 amperes.

In a further embodiment of the invention, the breakdown assistance device has at least one distributor device, preferably an electronically controllable distributor device, which distributes sealant via the feed opening in the breakdown assistance device. A distributor device may be a vessel or a container, wherein the distributor device is designed such that it is able to be connected to the feed opening. By way of example, the distributor device may be connected to the feed opening via a thread. This is advantageous since the connection between the distributor device and the feed opening is able to be released again when the sealant has been distributed in the vehicle tire after use, as a result of which the breakdown assistance device is able to be used flexibly. The distributor device is preferably able to be controlled electronically, with the control taking place for example via an additional control unit. It is likewise conceivable for the control to be able to take place via a user interface, with this being done manually by the user and/or automatically by a program.

The breakdown assistance device particularly preferably has at least one further control device that controls the distributor device and the pressure source, in particular the compressor. The ratio between the infeed of the sealant and the generated compressed air from the compressor is controlled and adjusted here such that the vehicle tire is sealed and inflated.

In one embodiment of the invention, the breakdown assistance device additionally comprises a user interface, in particular a display. The breakdown assistance device advantageously has at least one user interface, as a result of which the user is able to read relevant data, such as for example the pressure in the vehicle tire. The user may furthermore control the sealing and inflation process via the user interface. It is likewise conceivable for the user interface to be a digital display, in particular a touch-sensitive display. Such a display is designed such that all functions are able to be operated, thereby advantageously significantly simplifying the operation of the breakdown assistance device.

In a further embodiment of the invention, the breakdown assistance device has at least one elongate hollow body, in particular a tubular hollow body, which extends from the compressor and the end of which is able to be connected to a vehicle tire, in particular a valve on the vehicle tire. In the context of the invention, the compressed air that is generated in the compressor is transported through the elongate hollow body into the vehicle tire. Advantageously, the breakdown assistance device is able to be easily connected to the vehicle tire via the elongate hollow body, in particular a tubular hollow body. The elongate hollow body may be divided into multiple sections, wherein the sections may have different degrees of flexibility. These sections may preferably, vice versa, simply be connected to one another. Advantageously, the breakdown assistance device is able to be easily connected to the vehicle tire by the flexible sections. An elongate hollow body may be a hose or a tube. The hollow body may furthermore be understood to be a channel. The elongate hollow body may also comprise multiple lumens. It is conceivable for one lumen to be suitable for compressed air and one lumen to be suitable for a sealant. A connection device is preferably formed at the end of the elongate hollow body, as a result of which the elongate hollow body is able to be easily connected to the vehicle tire, in particular to the valve of the vehicle tire.

The breakdown assistance device particularly preferably has a portable compact housing in which the compressor, comprising the electric motor and the optional motor control device, and the elongate hollow body with the feed opening are arranged. Advantageously, the breakdown assistance device is easy to handle and is able to be used flexibly due to its compact design.

In a further embodiment of the invention, the breakdown assistance device has at least one additional wireless interface. It is advantageous in particular for data transmission to be possible, via such an additional interface, with devices that do not have a USB interface. It is conceivable here to control the breakdown assistance device via an app. The breakdown assistance device may accordingly be used flexibly and independently of the location of the user.

The embodiments in relation to the described breakdown assistance device apply, vice versa, to the breakdown assistance device described below.

In a further configuration, the invention targets a breakdown assistance device for sealing and inflating vehicle tires, comprising a distributor device with a sealant and a pressure source with an electric motor that is designed only for a rated voltage of greater than 12 volts, wherein the breakdown assistance device has at least one interface that is designed for supplying power and for transmitting data. Advantageously, the breakdown assistance device is able to be used flexibly via the interface, in particular in connection with power sources that are designed only for a rated voltage of greater than 12 volts.

In one embodiment of the invention, the electric motor is designed only for a rated voltage of at least 20 volts, in particular at least 24 volts. Advantageously, the power sources in certain vehicles, for example in electric cars, are designed only for a rated voltage of at least 20 volts, in particular at least 24 volts, meaning that the electric motor in the breakdown assistance device has to be designed for this voltage.

In a further configuration, the invention targets a method for controlling one of the two described breakdown assistance devices, comprising the following steps: (a) connecting the breakdown assistance device to a power source via at least one interface, wherein the interface is designed for supplying power and for transmitting data and is preferably connected to an on-board computer of a vehicle, (b) introducing sealant into a vehicle tire, wherein the introduction of sealant is preferably triggered via signals from the on-board computer to the electronically controllable distributor device of the breakdown assistance kit, and (c) introducing compressed air until the desired pressure is reached, wherein the introduction of compressed air is preferably triggered via signals from the on-board computer to the electronically controllable distributor device of the breakdown assistance kit, wherein steps b) and c) are carried out simultaneously or at different times. Advantageously, one of the breakdown assistance devices is thus able to be controlled in a simple and user-friendly manner. Furthermore, one of the breakdown assistance devices may be additionally supplied with power by external power sources and at the same time controlled by an internal or an external operator interface. It is conceivable for one of the breakdown assistance devices to be controlled via a display in the car. It is likewise conceivable for the control to be able to take place via a mobile telephone.

In one embodiment of the invention, the compressed air is introduced into the vehicle tire at a volume flow rate of between 5 and 30 liters per minute, preferably 10 to 20 liters per minute. Advantageously, a volume flow rate in this range is necessary in order to inflate a vehicle tire with enough compressed air. The compressed air and/or the volume flow rate may be adapted individually to the vehicle tire. It is conceivable for the desired final pressure in the vehicle tire to be input via a display, thereby significantly simplifying operation for the user.

The above explanations in relation to the breakdown assistance devices apply, vice versa, to the method according to the invention. The explanations described in relation to the method and the breakdown assistance devices likewise apply to the system described below.

In a further configuration, the invention targets a system for sealing and inflating vehicle tires, comprising one of the breakdown assistance devices already described and an on-board computer of a vehicle, wherein the breakdown assistance device is connected to the on-board computer via at least one interface, wherein the on-board computer and the electronically controllable distributor unit of the breakdown assistance device are in particular configured such that the on-board computer is able to trigger and control the introduction of compressed air and/or sealant by actuating the distributor unit. Advantageously, the user is able to easily control the breakdown assistance device via the on-board computer in the vehicle. To do this, the user connects the breakdown assistance device to a USB socket in the vehicle using a USB cable. The breakdown assistance device is thereby put into operation, it being possible to control the breakdown assistance device simultaneously via the display in the vehicle. The user is thus advantageously able to set and monitor all essential parameters digitally, thereby significantly simplifying operation for the user.

BRIEF DESCRIPTION OF THE SEVERAL VIEWS OF THE DRAWING(S)

Further details and advantages of the present invention will become apparent from the following description of the exemplary embodiment in conjunction with the drawing, in which FIGURE shows a schematic structure of a system comprising a breakdown assistance device and an on-board computer in a vehicle.

DETAILED DESCRIPTION

FIGURE shows a schematic structure of a system for sealing and inflating vehicle tires, comprising a breakdown assistance device 1 and a vehicle 2, wherein the vehicle 2 has a vehicle interface 3, an on-board computer 4 and at least one vehicle tire 5, wherein the vehicle interface 3 is able to communicate with the on-board computer 4. The communication paths are marked by arrows, wherein the direction of the arrow describes the communication direction. Communication is understood to mean both a power supply and data transmission.

The breakdown assistance device 1 furthermore has an interface 6 according to the invention, which is designed for supplying power and transmitting data, a data processing device 7, a compressor 8 and an optional sealant distributor device 9. It is essential that the sealant distributor device 9 is able to be connected to the breakdown assistance device 1 via a feed opening. The sealant distributor device 9 does not have to be part of the breakdown assistance device 1. The interface 6 is able to communicate with the data processing device 7, which is able to communicate with the compressor 8 and/or with the optional sealant distributor device 9. The breakdown assistance device 1 may be connected to the vehicle tire 5 via a hose on the valve of the vehicle tire 5.

The interface 5 may be connected to the on-board computer 4 by a cable, by a user via the vehicle interface 3, as a result of which the breakdown assistance device 1 is supplied with power. The user is able to operate and control the breakdown assistance device 1 via the on-board computer 4 in the vehicle 2. For this purpose, the breakdown assistance device 1 is able to be switched on and off at the on-board computer 4. It is furthermore possible for the user to control the infeed of air via the compressor 8 and the infeed of the sealant via the sealant distributor device 9 on the on-board computer 4. The user is thus able to fill the vehicle tire 5 with air or with sealant from inside the vehicle. For this purpose, for example, the air pressure or the fill level of the sealant may be read on the on-board computer 4. When the filling process is complete, the user is able to disconnect the breakdown assistance device 1 from the vehicle tire 5. The optional sealant distributor device 9 may be removed from the feed opening of the breakdown assistance device 1 and replaced with a new one.

LIST OF REFERENCE SIGNS

1 Breakdown assistance device
2 Vehicle
3 Vehicle interface
4 On-board computer
5 Vehicle tire
6 Interface
7 Data processing device
8 Compressor
9 Sealant distributor device

The invention claimed is:

1. A breakdown assistance device comprising:
a feed opening for feeding in a sealant and air;
a pressure source for the air;
a sealant distributor device that provides the sealant;
wherein the sealant distributor device is able to be connected to the breakdown assistance device via the feed opening;
a data processing device; and
an interface for supplying power and transmitting data, the interface connected to the pressure source, the sealant distributor device and the data processing device;
the feed opening is designed to infeed the sealant into a tire based on input to the interface.

2. The device of claim 1, the feed opening is designed to turn off the sealant to the tire.

3. The device of claim 1, further comprising an on board computer inside a vehicle connected to the interface.

4. The device of claim 3, the on board computer is designed to control operation of the sealant distributor device.

5. The device of claim 4, the on board computer is designed to turn the breakdown assistance device to ON and OFF state.

6. The device of claim 5, the feed opening is designed to supply the air and the sealant the tire based on input from inside the vehicle using the on board computer.

7. The device of claim 6, the feed opening is removable and replaceable.

8. The device of claim 7, an air pressure of the tire and a sealant fill level of the tire is designed to be read on the on board computer.

9. The device of claim 1, the interface includes one of a USB interface or a Lightning interface or a Thunderbolt interface.

10. The device of claim 1, the interface is a Thunderbolt interface and has a high speed data bus and display data.

11. The device of claim 1, the interface includes one of a USB 3.0 and/or USB 3.1 and/or USB-BC and/or USB-PD interface.

12. The device of claim 1, the pressure source is a compressor that comprises an electric motor and a motor control device, wherein the electric motor is preferably is designed only for a rated voltage greater than a range of 12 volts to 20 volts.

13. The device of claim 1, the interface is designed only for DC current with a power of at least 30 to 50 watts.

14. The device of claim 1, the distributor device is an electronically controllable distributor device, by way of which sealant is distributed via the feed opening in the breakdown assistance device.

15. The device of claim 1, further comprising a display to display air pressure and sealant fill level.

16. The device of claim 1, further comprising a tubular hollow body, which extends from the pressure source and the end of which is able to be connected to a valve on the vehicle tire.

17. The device of claim 1, further comprising at least one additional wireless interface.

18. A method for controlling a breakdown assistance device, the method comprising:

a) connecting a breakdown assistance device to a power source via at least one interface, wherein the interface is designed for supplying power and for transmitting data and is connected to an on-board computer of a vehicle, b) introducing a sealant into a vehicle tire, wherein the introduction of sealant is triggered via signals from the on-board computer to the electronically controllable distributor device of the breakdown assistance device, and c) introducing compressed air until the desired pressure is reached, wherein the introduction of compressed air is triggered via signals from the on-board computer to the electronically controllable distributor device of the breakdown assistance device, wherein introducing the sealant and the air are performed simultaneously and at a controlled ratio.

19. The method as claimed in claim 18, the compressed air is introduced into the vehicle tire at a volume flow rate of between 5 and 30 liters per minute.

20. A breakdown assistance device comprising:

a feed opening for feeding in a sealant and air;

a pressure source for the air;

a sealant distributor device that provides the sealant;

a data processing device;

an interface for supplying power and transmitting data, the interface connected to the pressure source, the sealant distributor device and the data processing device;

the data processing device provides information about an amount of sealant in the breakdown assistance device;

the data processing device provides information about an amount of sealant already fed to a vehicle tire;

a further control device is designed to control a ratio between infeed of the sealant and generated compressed air;

the feed opening is designed to infeed the sealant into the vehicle tire based on input to the interface.

* * * * *